US009086885B2

(12) United States Patent
Canter et al.

(10) Patent No.: US 9,086,885 B2
(45) Date of Patent: Jul. 21, 2015

(54) REDUCING MERGE CONFLICTS IN A DEVELOPMENT ENVIRONMENT

(71) Applicant: International Business Machines Corporation, Armonk, NY (US)

(72) Inventors: Alexander J. Canter, Rochester, NY (US); Taylor N. Clark, Vermillion, SD (US); Jonathan Goldszmidt, Dobbs Ferry, NY (US); Kelvin R. Lawrence, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/724,043

(22) Filed: Dec. 21, 2012

(65) Prior Publication Data
US 2014/0181789 A1    Jun. 26, 2014

(51) Int. Cl.
*G06F 9/44* (2006.01)
(52) U.S. Cl.
CPC .. *G06F 8/34* (2013.01); *G06F 8/33* (2013.01); *G06F 8/71* (2013.01)
(58) Field of Classification Search
CPC .................................... G06F 8/33; G06F 8/71
USPC ......................................................... 717/100
See application file for complete search history.

(56) References Cited

U.S. PATENT DOCUMENTS

| 6,393,437 | B1 | 5/2002 | Zinda et al. |
| 7,512,903 | B2* | 3/2009 | Hudson, Jr. ................... 715/853 |
| 7,631,294 | B2* | 12/2009 | Rush et al. ................... 717/111 |
| 2003/0233585 | A1 | 12/2003 | Quick et al. |
| 2007/0220348 | A1 | 9/2007 | Mendoza et al. |

OTHER PUBLICATIONS

Goldman et al., "Real-Time Collaborative Coding in a Web IDE," ACM, 2011, 10pg.*

* cited by examiner

*Primary Examiner* — Ryan Coyer
(74) *Attorney, Agent, or Firm* — David B. Woycechowsky; Trentice V. Bolar; Steven L. Bennett

(57) ABSTRACT

Embodiments of the present invention provide a system, method, and program product to reduce merge conflicts in an integrated development environment. The present invention includes a computer that receives computer code that includes a plurality of line edits authored by a plurality of developers and development activity information associated with the computer code describing the nature of the plurality of line edits. The computer displays in real-time the computer code in a manner that includes distinguishing the plurality of line edits based the development activity information. Furthermore, the computer dictates an editing activity of the computer code based on the development activity information. Furthermore, the present invention executes within an integrated development environment.

15 Claims, 8 Drawing Sheets

| | | |
|---|---|---|
| 1 | int main() | GLOBAL |
| 2 | { | GLOBAL |
| 3 | foo(); | LOCAL |
| 4 | bar(); | RESTRICTED |
| 5 | } | GLOBAL |
| 6 | void foo() | LOCAL |
| 7 | { | LOCAL |
| 8 | ... | LOCAL |
| 9 | } | LOCAL |
| 10 | void bar() | RESTRICTED |
| 11 | { | RESTRICTED |
| 12 | ... | RESTRICTED |
| 13 | } | RESTRICTED |

FIG. 2b

| | | |
|---|---|---|
| 1 | int main() | GLOBAL |
| 2 | { | GLOBAL |
| 3 | foo(); | RESTRICTED |
| 4 | bar(); | LOCAL |
| 5 | } | GLOBAL |
| 6 | void foo() | RESTRICTED |
| 7 | { | RESTRICTED |
| 8 | ... | RESTRICTED |
| 9 | } | RESTRICTED |
| 10 | void bar() | LOCAL |
| 11 | { | LOCAL |
| 12 | ... | LOCAL |
| 13 | } | LOCAL |

FIG. 2c

| 1 | int main() | GLOBAL |
| 2 | { | GLOBAL |
| 3 | foo(); | GLOBAL |
| 4 | bar(); | RESTRICTED |
| 5 | } | GLOBAL |
| 6 | void foo() | GLOBAL |
| 7 | { | GLOBAL |
| 8 | ... | GLOBAL |
| 9 | } | GLOBAL |
| 10 | void bar() | RESTRICTED |
| 11 | { | RESTRICTED |
| 12 | ... | RESTRICTED |
| 13 | } | RESTRICTED |

FIG. 2d

| | | |
|---|---|---|
| 1 | int main() | GLOBAL |
| 2 | { | GLOBAL |
| 3 | foo(); | GLOBAL |
| 4 | bar(); | LOCAL |
| 5 | } | GLOBAL |
| 6 | void foo() | GLOBAL |
| 7 | { | GLOBAL |
| 8 | ... | GLOBAL |
| 9 | } | GLOBAL |
| 10 | void bar() | LOCAL |
| 11 | { | LOCAL |
| 12 | ... | LOCAL |
| 13 | } | LOCAL |

REDUCING MERGE CONFLICTS IN A DEVELOPMENT ENVIRONMENT

FIELD OF THE INVENTION

The present invention relates generally to the field of integrated software development environments and more particularly to reducing merge conflicts in an integrated development environment.

BACKGROUND OF THE INVENTION

Contemporary software packages usually are comprised of thousands of line of code drafted by a team of developers and require a significant amount of man-hours to produce. To facilitate the drafting process, developers edit code within an integrated development environment (IDE), which packages many functions associated with developing software in one place. For example, an IDE may typically include a text editor, compiler, build automation tools, and a debugger.

An important aspect of software development is the ability for a developer to know the status of the code desired to be worked on, for example, available, restricted, etc. Status is typically provided by an individual, such as a computer software developer, who has been assigned tasks, such as the writing, debugging, and testing of computer software code, etc., that are required to complete the software development project. Typically, software development involves a number of developers editing different portions of the code (often at the same time).

A version control system (VCS) allows for the orderly updating of code modules and allows developers to backup and restore files, track file changes, track ownership, test code before synchronization. Using version control, each developer can retrieve (pull) their own copy of the central version of the source code file (working copy) or new changes (line edits) of a particular source code file and merge their line edits into the master branch or trunk (central version containing all working code) afterwards. Each developer can create their own branch (personal version of a particular source code file) and push (transmit) their line edits when they are working (have been compiled and deemed error free) to the master branch or trunk when it's working. Subsequent to the file being pushed to the master branch, the file is merged with the central version included therein.

When two developers are working on the same code, merge conflict issues can occur if both have pushed incompatible line edits to the master branch. Typically, one of the developers will have to sift through the code and determine the correct way to merge these source files together.

SUMMARY

Embodiments of the present invention provide a system, method, and program product to reduce merge conflicts in an integrated development environment. The present invention includes a computer that receives computer code that includes a plurality of line edits authored by a plurality of developers and development activity information associated with the computer code describing the nature of the plurality of line edits. The computer displays in real-time the computer code in a manner that includes distinguishing the plurality of line edits based the development activity information. Furthermore, the computer dictates an editing activity of the computer code based on the development activity information. Furthermore, the present invention executes within an integrated development environment.

In certain embodiments, the development activity information includes time/date of a line edit, developer ID information associated with a line edit, the nature of a line edit, and code status of a line edit. In other embodiments, the nature of the line edit is select from one of the following: changed line; new line; and deleted line. In still other embodiments, the code status of the line edit is selected from one of the following: accessible to all developers for further editing; accessible to the authoring developer only for further editing; and inaccessible to a non-authoring developer for further editing. In certain embodiments, the dictating the editing activity of the computer code based on the development activity information includes restricting editing activity of the computer code based on the code status of the line edit, wherein a line edit deemed inaccessible may not undergo editing by a non-authoring developer.

BRIEF DESCRIPTION OF THE SEVERAL VIEWS OF THE DRAWINGS

FIG. 2b depicts a screenshot of a display associated with a computing device that depicts the editing of a file on a computing device within the data processing environment of FIG. 1, in accordance with an embodiment of the present invention.

FIG. 2c depicts a screenshot of a display associated with an additional computing device within the data processing environment of FIG. 1 that depicts the editing of the file of FIG. 2b on the additional computing device, in accordance with an embodiment of the present invention.

FIG. 2d depicts a screenshot of a display associated with a computing device of FIG. 1 after a merge conflict reduction program (MCRP) determines that a local code generated by a development program has been designated as global code, in accordance with an embodiment of the present invention.

FIG. 2e depicts a screenshot of a display associated with a computing device of FIG. 1 after a MCRP determines that a local code generated by a development program has been designated as global code, in accordance with an embodiment of the present invention.

DETAILED DESCRIPTION

Figure 1:
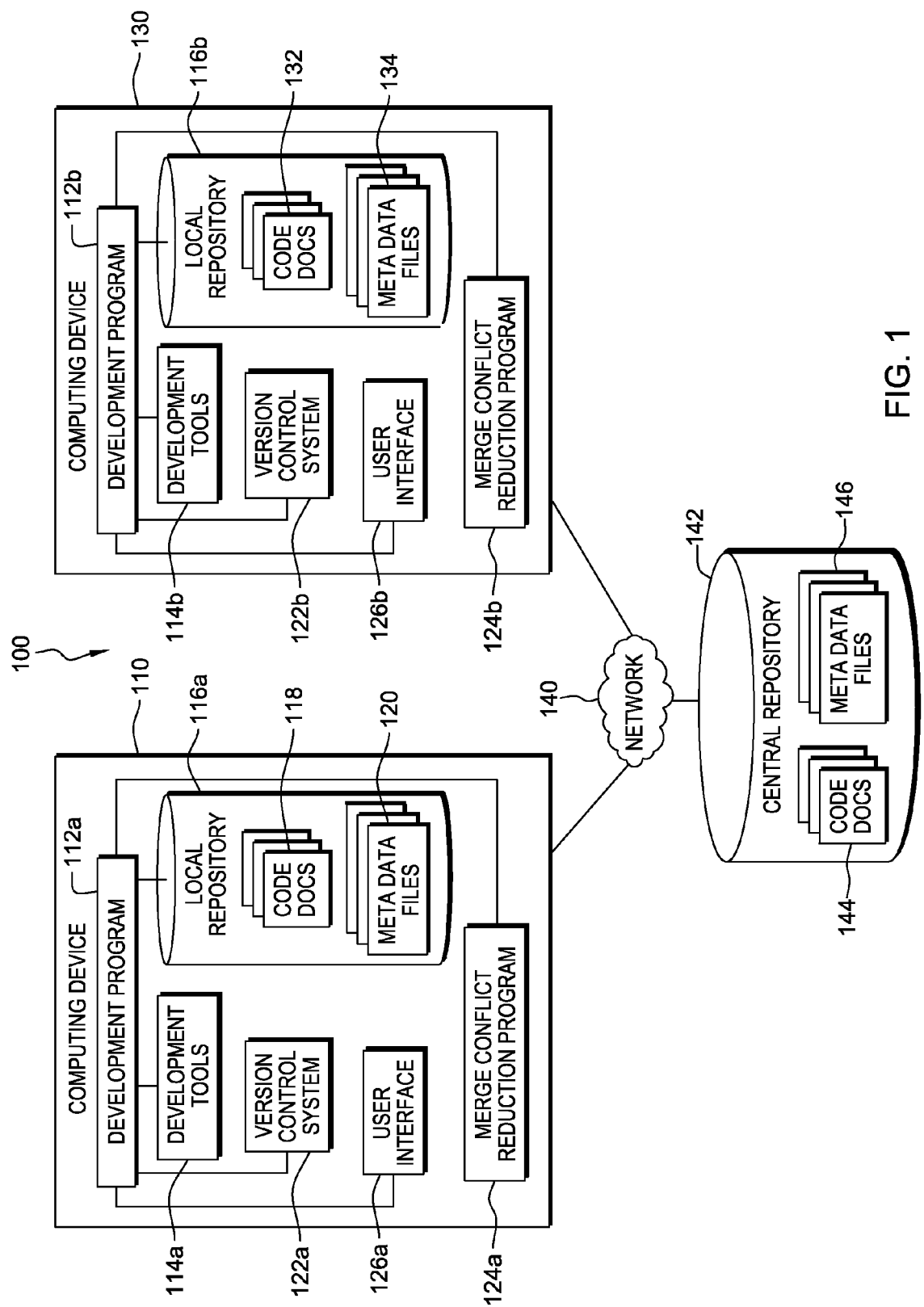
FIG. 1 is a functional block diagram illustrating a merge conflict reduction environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a merge conflict reduction environment, generally designated 100, in accordance with one embodiment of the present invention.

Merge conflict reduction environment 100 includes computing devices 110 and 130, and central repository 142, all interconnected over a network 140. Network 140 can be, for example, a local area network (LAN), a wide area network (WAN) such as the Internet, or a combination of the two, and includes wired, wireless, or fiber optic connections. Network 140 is connected central repository 142. In general, network 140 can be any combination of connections and protocols that will support communications between computing devices 110 and 130 and other devices, in accordance with an embodiment of the present invention.

Central repository 142 represents a data store that includes source code files (code) current and historical data associated with a particular code. Central repository 142 can include coding documents 144 (code docs 144) and metadata files 146. Further, central repository 142 may receive coding documents, for example, code docs 118 and 132, and metadata files, for example, metadata files 120 and 134, from a computing device associated with network 140, for example, computing devices 110 and 130, respectively.

Code docs 144 includes code that reflects a central version of a source file that includes all edits transmitted (pushed) by developers for merging with the central version of the code file, for example, via computing devices 110 and 130. Metadata files 146 can include information that reflects developer edits made to a particular code file, for example, information reflecting developer line changes associated with a particular coding document. Further, metadata 146 may include development activity information characterizing line edits associated with a code file included in code docs 144, for example, time/date of the line edit, developer ID information associated with a particular line edit, the nature of the line edit (changed line, new line, or deleted line), and code status of the line edit. The development activity information included in metadata files 146 may reflect development activity information included in metadata files 120 and/or 134 on computing devices 110 and/or 130, respectively. Code docs 144 and metadata files 146 may be accessed by a computing device associated with network 140, for example, computing devices 110 and 130.

Computing devices 110 and 130 represent computing devices utilized by a developer to execute any and all phases of the software development cycle, for example, from specification through writing, editing, building, compiling, and test/debugging of machine executable code, to software maintenance. Computing devices 110 and 130 are two entities that are separate from each other and distinct; however, the two entities can perform substantially the same functions, and may include distinct copies of the same software of the same program, in accordance with an embodiment of the present invention.

Computing devices 110 and 130 may be a laptop computer, tablet computer, netbook computer, personal computer (PC), a desktop computer, a personal digital assistant (PDA), a smart phone, or any programmable electronic device capable of communicating with other computing devices and central repository 142 via network 140. Computing devices 110 and 130 include development programs 112a and 112b, and merge conflict reduction program (MCRP) 124a and 124b, respectively.

Computing devices 110 and 130 may communicate with any computing device associated with network 140. In general, computing devices 110 and 130 may be any computing device that can be utilized by a developer to develop code, communicate with another computing device associated with network 140, includes a development program, version control module, and merge conflict reduction program, and access central repository 142, in accordance with an embodiment of the present invention.

Development programs 112a and 112b represent a computer program that allows a developer, via computing devices 110 and 130, respectively, to execute any and all phases of the software development cycle, for example, from specification through writing, editing, building, compiling, and test/debugging of machine executable code, to software maintenance. Development programs 112 include user interfaces 126, development tools 114, version control systems 122, and local repositories 116.

In general, development programs 112 can be any software capable of supporting any and all phases of a software development cycle and may include, for example, the specification phase, coding phase, building phase, compiling phase, described above, a maintenance phase, or any combination thereof, in accordance with an embodiment of the present invention. A building phase may be defined as the process of using a build tool to convert a plurality of source code files into a standalone software capable of running on a computer by transforming source code into machine executable code (compiling) and combining, in the correct order, objects generated by compiling the plurality of source code files into a single machine executable program (linking).

Source code files, for example, code docs 118 and 132, may either be retrieved by or created within a development program, such as development programs 112a and 112b, respectively. Development programs 112a and 112b, via version control modules 122a and 122b, respectively, which will be discussed in further detail below, may generate real-time and static development activity information that reflects a developer's progress, and historic or current development activities on a particular source code file, such as code docs 118 and 132, respectively.

Development programs 112a and 112b may be accessed via interfaces 126a and 126b, respectively. Interfaces 126a and 126b may be graphically and/or textually based. In general, user interfaces 126a and 126b may be any interface that allows a developer to access development programs 112a and 112b.

Developer tools 114a and 114b represent software development tools that a developer utilizes to generate coding documents. Developer tools 114a and 114b may access and manipulate code docs 118 and 132, respectively, through development program 112a and 112b, respectively. Developer tools 114a and 114b may include, for example, high level architecture design tools, a builder tool, a text or code editor tool that creates coding documents, for example code docs 118 and 132, respectively, a compiler tool, an interpreter tool, a test/debugger tool, and a build tool that converts source code files into standalone executable code. In general, developer tools 114a and 14b may be any program utilized by a developer to generate and edit source code files.

Local repositories 116a and 116b represent data stores that include source code files and development activity information associated with the source code files. In addition, local repositories 116a and 116b may be local copies of central repository 142. Changes to code docs and metadata files included in local repositories 116 must be synchronized with those included in central repository 142 to ensure that working copies of files included therein reflect all of the associated edits generated within merge conflict reduction environment 100. Synchronization of local repositories 116a and 116b with central repository 142 may be achieved using version control modules 122a and 122b, respectively. Local repositories 116a and 116b may include code docs 118 and 132, respectively and metadata files 120 and 134, respectively.

Code docs 118 and 132 represent source code files generated by development programs 112a and 112b, respectively, and/or retrieved from central repository 142, for example, code docs 144. Metadata files 120 and 134 represent development activity information associated with a source code file included in code docs 118 and 132, respectively. Development activity information includes information reflecting, for example, line edits associated with a particular code file, time/date of the line edit, developer ID information associated with a particular line edit, the nature of the line edit (line change, addition, or deletion), and code status, for example, global code, local code, or restricted code.

Global code is code that is accessible to all developers for further editing activities, such as a line change, addition, or deletion. Local code is code that is being written locally by a particular developer and that is accessible to the authoring developer only for further editing activities. Restricted code is code that is not being written locally and is inaccessible to a non-authoring developer for further editing activities. Metadata files 120 and 134 may include development activity information generated by version control modules 122a and 122b, respectively, and/or metadata files retrieved from central repository 142, for example, metadata files 146. In general, metadata files 120 and 134 may be any file that includes development activity information associated with a particular source code file.

Version control modules 122a and 122b represent programs that manage edits made to source code files, for example, code docs 118 and 132, respectively. Further, version control modules 122a and 122b may record developer development activity information in metadata files 120 and 134, respectively. Version control modules 122a and 122b may, via computing devices 110 and 130, respectively, retrieve code docs 144 and metadata files 146 from central repository 142. Version control module 122a and 122b may, via development program 112a and 112b, respectively, may transmit information, for example, code docs 118 and 132, respectively, to code docs 144.

In the same vein, version control modules 122a and 122b may, via development programs 112a and 112b, respectively, may transmit information, for example, metadata files 120 and 134, respectively, to metadata files 146.

MCRPs 124a and 124b represent computer programs that can display source code files in a manner that depicts the development activity information related therewith and reduce merge conflicts. MCRPs 124a and 124b may, via development programs 112a and 112b, instruct version control modules 122a and 122b to transmit information, for example, to metadata files 120 and 134, respectively, in real-time or periodically. MCRPs 124a and 124b may, via development programs 112a and 112b, instruct version control modules 122a and 122b to retrieve information from, for example, metadata files 120 and 134, respectively, continuously or periodically.

Further, MCRPs 124 may, via development programs 112, instruct version control modules 122 to transmit information, for example, to code docs 144, in real-time or periodically. MCRPs 124, via development programs 112, instruct version control modules 122 to retrieve information, for example, from code docs 144 continuously or periodically.

Further still, MCRPs 124a and 124b may instruct development programs 112a and 112b to display code docs 118 and 132, respectively, in a manner depicting the development activity information associated therewith in real-time or periodically. Furthermore, MCRPs 124a and 124b may, via development programs 112a and 112b, dictate the editing activity of code docs 118 and 132 based on the development activity information included in metadata files 120 and 134, respectively. In general, MCRPs 124a and 124b can be any program that can reduce merge conflicts that may occur during simultaneous editing of a code segment by restricting a developer's access to another developer's code that is still in development (restricted code) and restricting the developer's ability to push un-compiled to the central repository, in accordance with an embodiment of the present invention.

Concepts introduced in the following discussions of FIGS. 2a through 2e will be used further in the discussion of FIG. 3 in the context of merge conflict reduction environment 100 of FIG. 1. Specifically, FIGS. 2a through 2e illustrate an embodiment of the present invention wherein a particular code segment is accessed and edited simultaneously by two different developers. MCRPs 124a and 124b reduces merge conflicts in an integrated development environment by restricting a developer's ability to edit code that another developer is currently developing and restricting a developer's ability to push uncompiled (untested) code to the central repository.

Figure 2A:
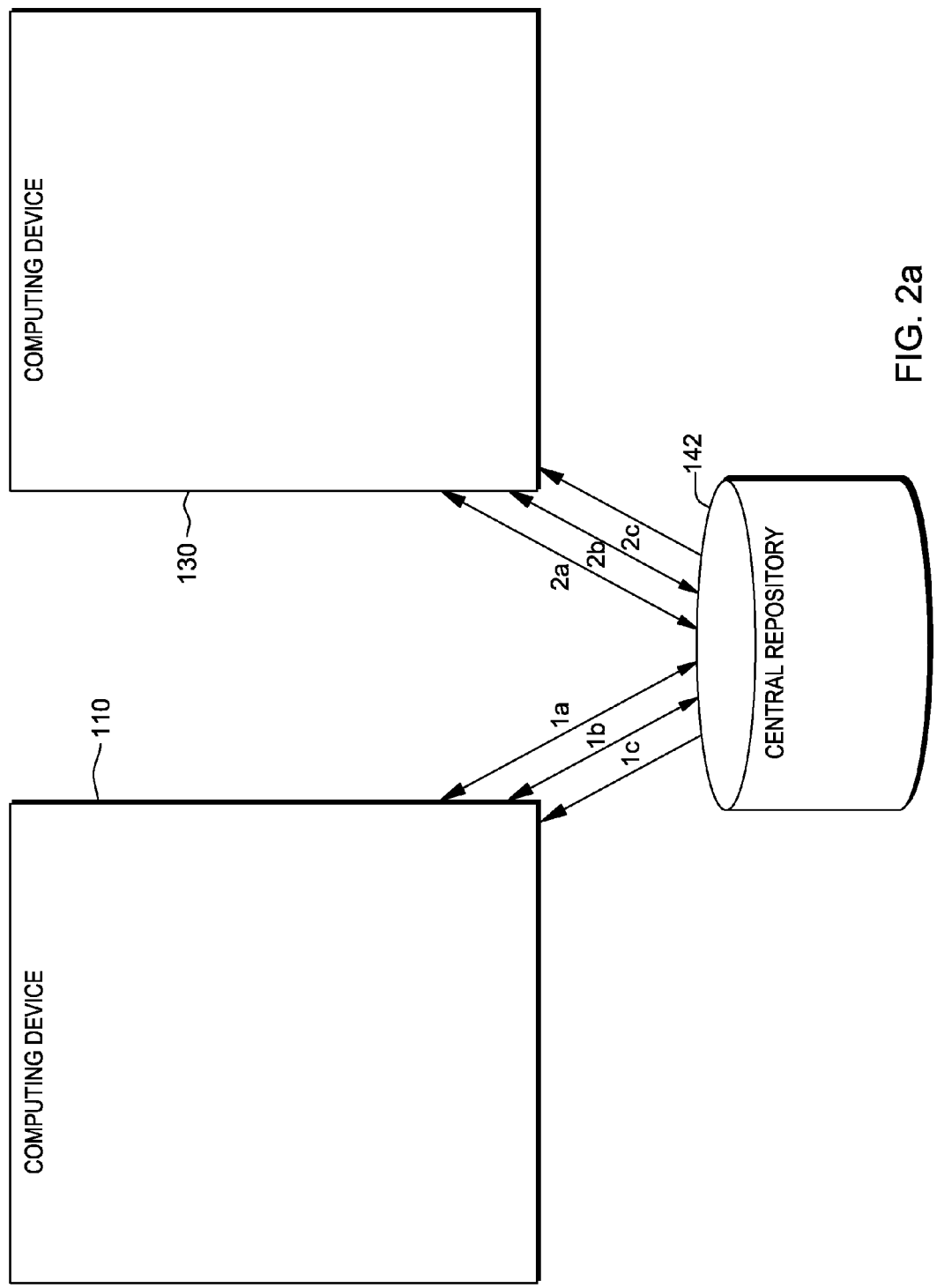
FIG. 2a is a depiction of various pull/push cycles and pull transmissions between the computing devices and the central repository of FIG. 1, in accordance with an embodiment of the present invention.

FIG. 2a is a depiction of various pull/push cycles (cycles) and pull transmissions between the computing devices and the central repository of FIG. 1. In particular, cycle 1a represents a pull/push cycle involving computing device 110 and central repository 142. Cycle 1a initiates when MCRP 124a detects the execution of development program 112a. MCRP 124a detects the retrieval of file XYZ by development program 112a from code docs 118. MCRP 124a, via development program 112a, instructs version control module 122a to retrieve any code included in code docs 118 that is not included in code docs 118 (new code) and concomitant development activity information from metadata files 146. Development program 112a continues to execute the new code retrieval request until development program 112a stops executing.

For example, to determine the existence of new code, version control module 122a, via computing device 110, retrieves development activity information from metadata files 146 and compares the line edit date/time stamps included therein with the line edit date/time stamps included in metadata files 120. If version control module 122a determines that there is a difference in the line edit's date/time stamps included in metadata files 146 and 120, then new code exists and version control module 122a retrieves that new code. However, if version control module 122a determines that there is no difference in the line edit's date/time stamps included in metadata files 146 and 120, then no new code exist Subsequent to the comparison, version control module 122a determines that metadata files 120 and 146 include identical line edit date/time stamps; hence, no new code is available for file XYZ.

Cycle 2a overlaps with cycle 1a. The actions of a second developer that desires to access and edit code file XYZ are captured in cycles 2a and 2b, and pull transmission 2c. Cycle 2a represents a second push/pull cycle that includes computing device 130 and main repository 142. Cycle 2a initiates when development program 112b retrieves a working copy, defined above, of file XYZ from code docs 144 and concomitant development activity information from metadata files 146. Subsequently, because file XYZ was retrieved in cycle 1a by computing device 110, file XYZ is edited simultaneously on computing devices 110 and 130, via development program 112a and 112b, respectively.

As file XYZ code is being edited by development programs 112a and 112b, version control modules 122a and 122b, generate development activity information related to the edits, for example, developer ID, nature of the line edit, and date/time stamp of each line edit, and stores the information in metadata files 120 and 134, respectively, and the line edits in code docs 118 and 132 respectively. Cycles 1a and 2a conclude as MCRPs 124a and 124b, respectively, instruct version control modules 122a and 122b, respectively, to transmit the file XYZ line edits and the generated development activity information related to the edits to metadata files 146. For example, such a transmission may be made continuously as edits occur or periodically over a predetermined amount of time.

MCRPs 124a and 124b, via development programs 112a and 112b, respectively, display file XYZ code in a manner depicting the status of each line of code included therein derived from the development activity information related therewith. For example, a unique visual characteristic may be utilized to distinguish the status of each line of code. For example, MCRP 124a determines which developer is associated with computing device 110 and, using the developer ID information included in metadata files 120, displays each line of code related to that particular developer with a "local" code status indicator. Further, MCRP 124a displays the remaining lines of code as either "global" code (previously compiled code accessible by all developers) or "restricted" code (code related to another developer that has yet to be converted to global code) status indicator. A developer converts local code to global code by compiling the local code for example. However, a developer may only compile their own local code. For example, MCRP 124a instructs development program 112a to only compile global and local code and not to compile restricted code.

Cycles 1b and 2b represent push/pull cycles involving computing devices 110 and 130, respectively, and central repository 142. Cycles 1b and 2b initiate when version control modules 122a and 122b, respectively, determine that new code related to file XYZ is included in central repository 142, for example, by utilizing the procedure described above. Version control modules 122a and 122b retrieve new code related to file XYZ from code docs 144 and concomitant development activity information from metadata files 146. Subsequent to the retrieval, MCRPs 124a and 124b display file XYZ code included in local repositories 116a and 116b, respectively, in a manner depicting code status.

For example, MCRP 124a determines which developer is associated with computing device 110 and, using the developer ID information included in metadata files 120, displays each line of code related to that particular developer with a "local" code status indicator. Further, MCRP 124a displays the remaining lines of code as either "global" code (previously compiled code accessible by all developers) or "restricted" code (code related another developer that has yet to be converted to global code) status indicator. FIGS. 2b and 2c, discussed in greater detail below, illustrate displays associated with computing devices 110 and 130, respectively, as file XYZ is simultaneously being edited.

After editing code retrieved in cycles 1a, 1b, 2a, and 2b, developers associated with computing devices 110 and 130 desire to compile their edits and push them to central repository 142. For example, MCRPs 124a and 124b instruct version control modules 122a and 122b, respectively, to merge locally edited code related to file XYZ included in code docs 118 and 132, respectively, with the working version of file XYZ code included in code docs 118 and 132, respectively.

Subsequent to the merge, MCRPs 124a and 124b determine that a local build request involving file XYZ was initiated and instructs development program 112a and 112b, respectively, to only pass code that includes a global or local status indicator to the compiler tool included in development tools 114a and 114b, respectively. Only after the build occurs, may a developer choose to make their code accessible to other developers by designating said code as global code. For example, MCRPs 124a and 124b, via development program 112a, respectively, change the local code status indicators included in metadata files 120 and 134, respectively, which relate to file XYZ from local to global and transmits that information to metadata files 146. By restricting a developer's ability to push uncompiled (untested) code to central repository 142 because it has not been tested, MCRPs 124a and 124b can reduce merge conflicts that can occur when untested code is pushed to central repository 142.

MCRPs 124a and 124b determine that code labeled as local is now designated as global by the developer. Cycles 1b and 2b conclude as MCRPs 124a and 124b, respectively, instruct version control module 124a and 124b, respectively, to transmit (push) the new labeled and compiled global code and related development activity information included in metadata files 120 and 134, respectively, to central repository 142, wherein the global code will be merged with the central version located in code docs 144.

Pull transmissions 1c and 2c represents a retrieval of new code status indicators related to file XYZ from central repository 142 by version control modules 122a and 122b, respectively, via computing devices 110 and 130, respectively. Subsequent to the push, version control modules 122a and 122b determine that central repository 142 includes new code status indicators related to file XYZ and retrieves the new code status indicators related to file XYZ from metadata files 146. For example, version control modules 122a and 122b may determine new code status indicators related to file XYZ code by comparing time/date stamps of code status indicators related to file XYZ included in metadata files 134 and 146, respectively.

FIGS. 2b and 2c illustrate a screenshot of output by development programs 112a and 112b, respectively, as file XYZ is edited simultaneously on computing devices 110 and 130. In particular, FIG. 2b depicts a screenshot of a display associated with computing device 110 that depicts the editing of file XYZ on computing device 110 within merge conflict reduction environment 100, in accordance with an embodiment of the present invention, wherein lines 1, 2, and 5 are designated as global code. The designated global code is the code that was originally in the working copy of file XYZ edited by development programs 112a and 112b. Lines 3, and 6-9 are designated as local code, because these are the lines of code generated by development program 112a, and lines 4, and 10-13 are designated as restricted code, because these are the lines of code generated by development program 112b.

In the same vein, FIG. 2c depicts a screenshot of a display associated with computing device 130, wherein lines 1, 2, and 5 are designated as global code, lines 4, and 10-13 are designated as local code and lines 3, and 6-9 are designated as restricted code.

FIGS. 2d and 2e illustrate the output by development programs 112a and 112b, respectively, after pull transmission 1c and 2c, respectively. In particular, FIG. 2d depicts a screenshot of a display associated with computing device 110 after MCRP 124a determines that the local code generated by development program 112a has been designated as global code, wherein lines 1-3, and 5-9 are currently designated as global code and lines 4, and 10-13 are currently designated as restricted code. In the same vein, FIG. 2e depicts a screenshot of a display associated with computing device 130 after MCRP 124b determines that restricted code is currently designated as global code, wherein lines 1-3 and 5-9 are currently designated as global code and lines 4, and 10-13 are currently designated as local code.

Figure 3:
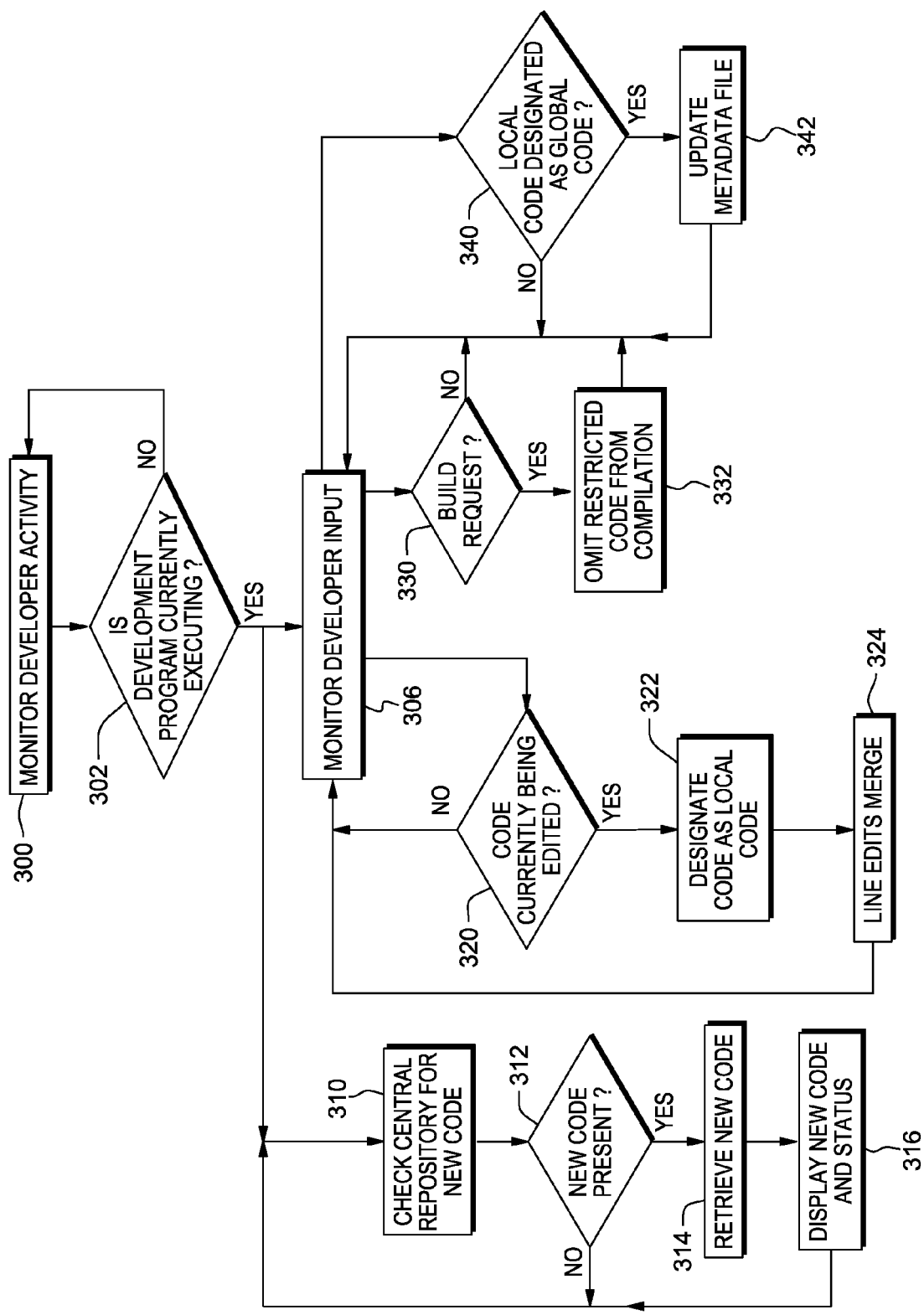
FIG. 3 is a flowchart depicting the operational steps of a merge conflict reduction program executing on a computing device within the data processing environment of FIG. 1, in accordance with an embodiment of the present invention.

FIG. 3 is a flowchart depicting operational steps of MCRP 124a for reducing merge conflicts in a development program, in accordance with an embodiment of the present invention. MCRP 124a monitors developer activity within computing device 110 (step 300). If MCRP 122a determines that development program 112a is executing within computing device 110 ("yes" branch decisional 302), then MCRP 124a monitors developer input within development program 112a (step 306). If MCRP 122a determines that development program 112a is not executing within computing device 110, then MCRP 122a returns to monitoring developer activity within computing device 110 ("no" branch decisional 302).

Subsequent to step 302, MCRP 124a instructs version control module 122a to check central repository 142 for new code related to files included in code docs 118 (step 310). If version control module determines that central repository 142 includes no new code related to files included in code docs 118 ("no" branch, decisional 312), MCRP 124a continues to instruct version control module 122a to determine whether central repository 142 includes new code related to files included in code docs 118. If version control module 122a determines that central repository 142 includes new code related to files included in code docs 118 ("yes" branch, decisional 312), MCRP 124a instructs version control module 122a to retrieve the new code from code docs 144 and related development activity information from metadata files 120 (step 314). MCRP 124a via development program 112a, displays the new code and the concomitant code status and returns to step 310 (step 316).

If MCRP 124a determines that no code is currently being edited in development program 112a ("no" branch, decisional 320), MCRP 124a returns to step 306. If MCRP 124a determines that code is currently being edited in development program 112b ("yes" branch, decisional 320), MCRP 124a designates that code as local code (step 322). Subsequent to the designation, MCRP 124a instructs version control module 122a to merge the local code, wherein the line edits are merged with the working copy of the file and returns to monitoring developer input (step 324). If MCRP 124a determines that development program 112a received a build requested ("yes" branch, decisional 330), MCRP 124a instructs development program 112a to omit restricted code from the compilation and returns to monitoring developer input as per development program 112a (step 332). If MCRP 124a determines that development program 112a did not receive a build requested ("no" branch, decisional 330), MCRP 124a continues to monitor developer input as per development program 112a.

If MCRP 124a determines that code previously designated as local code is currently designated as global code ("yes" branch, decisional 340), then MCRP 124a instructs version control module 122a to update the current designation in metadata files 146 and push the designation to metadata files 146 and continues to monitor developer input as per development program 112a (step 342). If MCRP 124a determines that code previously designated as local code is not currently designated as global code ("no" branch, decisional 340), then MCRP 124a continues to monitor developer input as per development program 112a.

Figure 4:
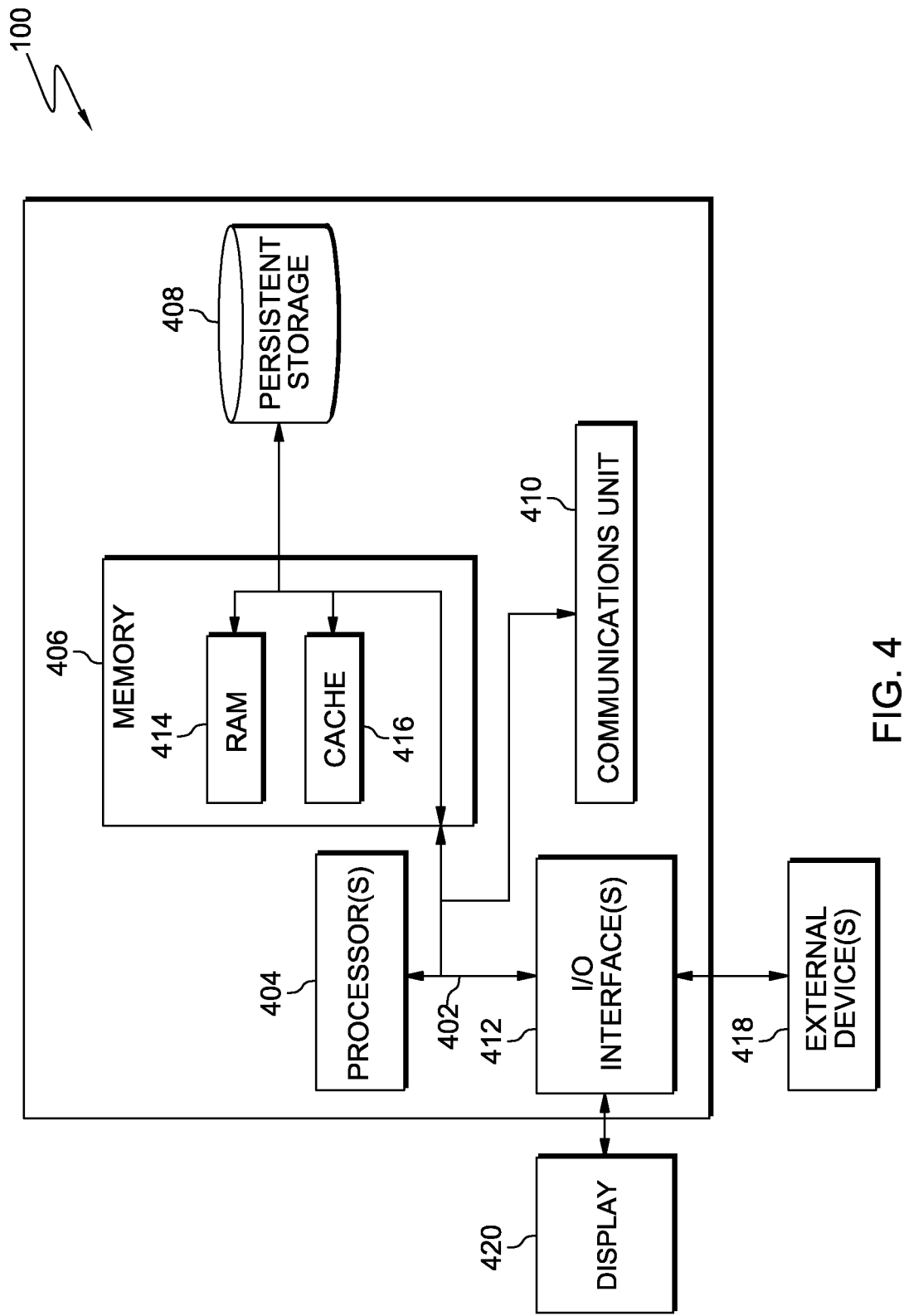
FIG. 4 depicts a block diagram of components of the proxy server computer executing an intelligent mapping program, in accordance with an embodiment of the present invention.

FIG. 4 depicts a block diagram of components of computing devices 110 and 130 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing devices 110 and 130 include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Development programs 112 and merge conflict reduction programs 124 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of computing devices 110 and 130. In these examples, communications unit 410 includes one or more network interface cards. Communications unit 410 may provide communications through the use of either or both physical and wireless communications links. Development program 112a and MCRP 124a may be downloaded to persistent storage 408 through communications unit 410.

I/O interface(s) 412 allows for input and output of data with other devices that may be connected to computing device 110 and 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., development program 112a, development program 112b, MCRP 124a and MCRP 124b, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for reducing merge conflicts in an integrated development environment, the method comprising:
    a computer receiving computer code within an integrated development environment, wherein the computer code includes a plurality of line edits authored by a plurality of developers;
    the computer receiving development activity information associated with the computer code describing the nature of the plurality of line edits;
    the computer displaying in real-time the computer code in a manner that includes: (i) distinguishing the plurality of line edits based on the development activity information, and (ii) indicates, on a line edit by line edit basis, one of the following restriction statuses: global, local, or restricted; and
    the computer dictating an editing activity of the computer code based on the development activity information; and wherein the development activity information includes time/date of a line edit, developer ID information associated with a line edit, a nature of a line edit, and a code status of a line edit.

2. The method of claim 1, wherein the respective nature of each line edit is selected from the following:
changed line;
new line; and
deleted line.

3. The method of claim 1, wherein the respective code status of each line edit is selected from the following:
accessible to all developers for further editing;
accessible to the authoring developer only for further editing; and
inaccessible to a non-authoring developer for further editing.

4. The method of claim 1, wherein the dictating the editing activity of the computer code based on the development activity information includes restricting editing activity of the computer code based on the code status of the line edit, wherein a line edit deemed inaccessible may not undergo editing by a non-authoring developer.

5. The method of claim 1, wherein the distinguishing the plurality of line edits based on the development activity information includes utilizing a unique visual characteristic to distinguish the plurality of line edits based on the development activity information.

6. A computer system for reducing merge conflicts in an integrated development environment, the computer system comprising:
one or more computer processors;
one or more computer-readable storage media;
program instructions stored on the computer-readable storage media for execution by at least one of the one or more processors, the program instructions comprising:
program instructions to receive computer code within an integrated development environment that includes a plurality of line edits authored by a plurality of developers;
program instructions to receive development activity information associated with the computer code describing the nature of the plurality of line edits;
program instructions to display in real-time the computer code in a manner that includes: (i) program instructions to distinguish the plurality of line edits based the development activity information, and (ii) indicates, on a line edit by line edit basis, one of the following restriction statuses: global, local, or restricted;
program instructions to dictate an editing activity of the computer code based on the development activity information; and
wherein the development activity information includes time/date of a line edit, developer ID information associated with a line edit, the nature of a line edit, and code status of a line edit.

7. The computer system of claim 6, wherein the respective nature of each line edit is selected from one of the following:
changed line;
new line; and
deleted line.

8. The computer system of claim 6, wherein the respective code status of each line edit is selected from one of the following:
accessible to all developers for further editing;
accessible to the authoring developer only for further editing; and
inaccessible to a non-authoring developer for further editing.

9. The computer system of claim 6, wherein the program instructions to dictate the editing activity of the computer code based on the development activity information includes program instructions to restrict editing activity of the computer code based on the code status of the line edit, wherein a line edit deemed inaccessible may not undergo editing by a non-authoring developer.

10. The computer system of claim 6, wherein the program instructions to distinguish the plurality of line edits based on the development activity information includes program instructions to utilize a unique visual characteristic to distinguish the plurality of line edits based on the development activity information.

11. A computer program product for reducing merge conflicts in an integrated development environment, the computer program product comprising:
one or more non-transitory computer-readable storage media and program instructions stored on the one or more computer-readable storage media, the program instructions comprising:
program instructions to receive computer code within an integrated development environment that includes a plurality of line edits authored by a plurality of developers,
program instructions to receive development activity information associated with the computer code describing the nature of the plurality of line edits,
program instructions to display in real-time the computer code in a manner that: (i) includes program instructions to distinguish the plurality of line edits based the development activity information and (ii) indicates, on a line edit by line edit basis, one of the following restriction statuses: global, local, or restricted, and
program instructions to dictate an editing activity of the computer code based on the development activity information; and
wherein the development activity information includes time/date of a line edit, developer ID information associated with a line edit, the nature of a line edit, and code status of a line edit.

12. The computer program product of claim 11, wherein the respective nature of each line edit is select from one of the following:
changed line;
new line; and
deleted line.

13. The computer program product of claim 11, wherein the respective code status of each line edit is selected from one of the following:
accessible to all developers for further editing;
accessible to the authoring developer only for further editing; and
inaccessible to a non-authoring developer for further editing.

14. The computer program product of claim 11, wherein the program instructions to dictate the editing activity of the computer code based on the development activity information includes program instructions to restrict editing activity of the computer code based on the code status of the line edit, wherein a line edit deemed inaccessible may not undergo editing by a non-authoring developer.

15. The computer program product of claim 11, wherein the program instructions to distinguish the plurality of line edits based on the development activity information includes program instructions to utilize a unique visual characteristic to distinguish the plurality of line edits based on the development activity information.

\* \* \* \* \*